United States Patent
Hofsommer et al.

(10) Patent No.: US 10,422,225 B2
(45) Date of Patent: Sep. 24, 2019

(54) ANNULAR CLAMPING NUT FOR A TIE BAR

(71) Applicant: Siemens Aktiengesellschaft, Munich (DE)

(72) Inventors: Daniel Hofsommer, Teltow (DE); Karsten Kolk, Mülheim a.d. Ruhr (DE); Peter Kury, Essen (DE); Matthias Richter, Berlin (DE); Michael Schulz, Berlin (DE); Dirk Springborn, Berlin (DE)

(73) Assignee: Nord-Lock Switzerland GmbH, St. Gallenkappel (CH)

( * ) Notice: Subject to any disclaimer, the term of this patent is extended or adjusted under 35 U.S.C. 154(b) by 298 days.

(21) Appl. No.: 15/307,972

(22) PCT Filed: May 11, 2015

(86) PCT No.: PCT/EP2015/060346
§ 371 (c)(1),
(2) Date: Oct. 31, 2016

(87) PCT Pub. No.: WO2015/173182
PCT Pub. Date: Nov. 19, 2015

(65) Prior Publication Data
US 2017/0051611 A1    Feb. 23, 2017

(30) Foreign Application Priority Data

May 12, 2014   (DE) ................. 10 2014 208 927
Sep. 29, 2014  (DE) ................. 10 2014 219 643

(51) Int. Cl.
*F16B 31/00*    (2006.01)
*F01D 5/06*     (2006.01)
(Continued)

(52) U.S. Cl.
CPC .............. *F01D 5/066* (2013.01); *B23P 15/04* (2013.01); *F01D 5/026* (2013.01)

(58) Field of Classification Search
CPC ....................................................... F01D 5/066
(Continued)

(56) References Cited

U.S. PATENT DOCUMENTS 2,571,265 A  * 10/1951  Leufven .................. B25B 29/02
                                                       100/214
4,083,639 A     4/1978  Terry
(Continued)

FOREIGN PATENT DOCUMENTS

DE        2542321 A1    4/1976
DE    102008060571 A1   6/2010

OTHER PUBLICATIONS

International Search Report dated Aug. 7, 2015, for PCT application No. PCT/EP2015/060346.

*Primary Examiner* — Gary W Estremsky
(74) *Attorney, Agent, or Firm* — Beusse Wolter Sanks & Maire

(57) ABSTRACT

An annular clamping nut which is provided for being placed onto the end of a tie bar, in order to brace the latter, and which has in addition to a central recess for receiving the tie bar parallel to a longitudinal direction passages at uniform radial spacings in the ring circumferential direction which are directed parallel to the longitudinal direction of the central recess and are provided for receiving clamping screws. An external thread is provided on the outer surface of the clamping nut, which outer surface is arranged on a side which lies substantially opposite the wall of the central recess, which external thread runs substantially in the ring circumferential direction of the outer surface.

14 Claims, 3 Drawing Sheets

(51) Int. Cl.
*F01D 5/02* (2006.01)
*B23P 15/04* (2006.01)

(58) Field of Classification Search
USPC ................................ 411/14.5, 15; 81/57.38
See application file for complete search history.

(56) References Cited

U.S. PATENT DOCUMENTS

| | | | | |
|---|---|---|---|---|
| 4,338,037 A * | 7/1982 | Deminski | ............ | F04B 39/0022 403/24 |
| 4,622,730 A * | 11/1986 | Steinbock | ............. | B21B 27/035 403/320 |
| 4,927,305 A * | 5/1990 | Peterson, Jr. | ......... | F16B 31/025 403/16 |
| 5,083,889 A * | 1/1992 | Steinbock | ............. | B21B 27/035 403/320 |
| 5,257,905 A | 11/1993 | Wynn et al. | | |
| 5,846,042 A * | 12/1998 | Iannuzzi | ................ | F16D 11/14 411/120 |
| 5,850,978 A * | 12/1998 | Jacobson | ................ | B02C 2/005 241/215 |
| 6,263,764 B1 * | 7/2001 | Steinbock | ............ | B23P 19/067 29/452 |
| 7,290,560 B2 * | 11/2007 | Orr | ....................... | F04B 53/007 137/454.2 |
| 7,637,706 B2 * | 12/2009 | Steinbock | ............. | B30B 15/045 411/14.5 |
| 8,261,421 B2 * | 9/2012 | Monville | ............... | B23P 19/067 29/407.01 |
| 8,328,482 B2 * | 12/2012 | Britton | ................... | B25B 29/02 254/29 R |
| 8,832,921 B2 * | 9/2014 | Marks | ..................... | B02C 2/005 241/207 |
| 2011/0225822 A1 | 9/2011 | Humhauser | | |

* cited by examiner

ANNULAR CLAMPING NUT FOR A TIE BAR

CROSS REFERENCE TO RELATED APPLICATIONS

This application is the US National Stage of International Application No. PCT/EP2015/060346 filed May 11, 2015, and claims the benefit thereof. The International application claims the benefit of German Application No. DE 102014208927.1 filed 12 May 2014 and German Application No. DE 102014219643.4 filed 29 Sep. 2014. All of the applications are incorporated by reference herein in their entirety.

FIELD OF INVENTION

The present invention relates to an annular clamping nut which is provided to be placed onto the end of a tie bar in order to tension said tie bar and which has, in addition to a central recess for receiving the tie bar, passages with uniform radial spacings in the ring circumference direction which are parallel to a longitudinal direction, which passages are directed parallel to the longitudinal direction of the central recess and are provided for receiving clamping screws. Furthermore, the present invention relates to a clamping nut system which comprises a clamping nut of this kind and also a tie bar system which likewise comprises a clamping nut system of this kind, as well as a clamping device. Moreover, the invention relates to a gas turbine which has a tie bar system of this kind and also a method of bracing a tie bar system.

BACKGROUND OF INVENTION

Gas turbines, as well as other rotary engines, typically exhibit a rotatable rotor in a fixed housing or else a rotatable shaft. In the case of a gas turbine, the fixed components are referred to as the stator. Between the shaft (rotor) and the stator is typically arranged a flow channel for a working medium running in an axial direction. In particular, rotors in a gas turbine are customarily exposed to high mechanical and thermal loads on account of the operating conditions. The high temperatures of the working medium and the forces acting on the rotor when the gas turbine is operating mean that the rotor components are under a great deal of stress.

During assembly of the shaft and components of a rotary engine, the individual components are typically tensioned by means of a tie bar. Under normal circumstances, the tie bar is received by the shaft and arranged therein. For assembly of the shaft and components, each component typically exhibits an axially extending recess through which the tie bar runs. In order to tension the tie bar, a screw nut can be placed onto one end of the tie bar, which fixes the individual components during tensioning and applies mechanical stress to the tie bar. This means that the components are in pressing contact with one another on the tie bar and are therefore able to suitably transmit the rotatory forces acting on them when the rotary engine is in operation.

In many types of gas turbine and also in many rotary engines, clamping nuts are used with multiple clamping screws to tension the tie bar. Multiple clamping screws should be understood to be a set of individual clamping screws which, following individual tensioning, can expose the clamping nut to a sufficient total tensioning force. Due to the high temperatures that sometimes occur and can act on the clamping nut when the rotary engine is in operation, lubricant may escape at the clamping screws and microscopic deformations may also possibly occur, so that during maintenance work, for example, and the loosening of the clamping screws, one or more of these may become stuck so that they can no longer be mechanically loosened. In a case of this kind which is particularly inconvenient for the rotary engine operator, it is sometimes no longer possible for the machine to be dismantled and maintenance work carried out. In order to be able to carry out the dismantling, however, the only option available to the operator is to destroy the clamping nut in question, although this may result in the destruction of the tie bar and the entire rotary engine with it.

Furthermore, it has proved disadvantageous that during the tensioning of the tie bar the clamping force has to be applied to the clamping nut via the individual clamping screws. Since, on the one hand, the clamping nut must exhibit many individual clamping screws of this kind in order to be able to apply the high total clamping force, the tensioning process has proved very time-consuming. Furthermore, it is not impossible for some of the individual clamping screws to become twisted themselves, as from time to time some individual clamping screws contribute more to the total clamping force, comparatively speaking, than others. In other words, it is essential for all individual clamping screws to be tightened uniformly, so that during the very time-consuming tensioning process, individual clamping screws do not suffer any twisting due to the high clamping forces. Practical considerations make this very difficult, however, as even small differences in the stroke of the individual clamping screws can lead to greatly differing clamping force loads.

These disadvantages from the state of the art illustrate that a technical solution is required so that, particularly in the case of clamping nuts with multiple clamping screws, a controlled tensioning of the tie bar system and also a controlled dismantling of the entire rotary engine is furthermore possible. This means that dismantling should still be possible, even if one or more of the clamping screws gets stuck. Furthermore, it is a technical requirement for a clamping nut to be proposed which can allow easier dismantling of a rotary engine. In particular, this should apply to rotary engines which are exposed to high temperatures sometimes in excess of 350° C. in the region of the shaft (or the rotor).

SUMMARY OF INVENTION

These problems on which the invention is based are solved by an annular clamping nut, a clamping nut system, a tie bar, a clamping device, a gas turbine, and a method of tensioning a tie bar system according to the claims.

In particular, the problems on which the invention is based are solved by an annular clamping nut which is provided to be placed onto the end of a tie bar, in order to tension said tie bar, and which has, in addition to a central recess for receiving the tie bar, passages with uniform radial spacings in the ring circumference direction which are directed parallel to the longitudinal direction of the central recess and are provided to receive clamping screws, wherein on the outer surface of the clamping nut which is particularly arranged on a side substantially opposite the wall of the central recess, an external thread is provided which runs substantially in the ring circumference direction of the outer surface (outer ring surface).

Furthermore, the problems on which the invention is based are solved by a clamping nut system which comprises a clamping nut of the kind described previously or also of the kind described below, and also clamping screws which extend through the passages in the clamping nut, wherein the clamping screws are in contact at the end with a single clamping ring which is not included in the clamping nut.

Furthermore, the problems on which the invention is based are solved by a tie bar system comprising a clamping nut such as that described previously or also below, and also clamping screws which extend through the passages of the clamping nut, and also a tie bar which is guided at the end through the central recess of the clamping nut, wherein a clamping device is arranged in the region of the outer surface of the clamping nut, which clamping device is screwed with the external thread of the clamping nut.

Furthermore, the problems on which the invention is based are solved by a clamping device comprising a recess which has an internal thread that can be screwed onto a matching external thread of a clamping nut, and also at least one lifting means which is configured, during correct operation, to apply a clamping force to the clamping device, wherein the at least one lifting means can rest against a component surface of a gas turbine including a tie bar during this.

Furthermore, the problems on which the invention is based are solved by a gas turbine comprising a tie bar system described previously and also below.

Moreover, the problems on which the invention is based are solved by a method of tensioning a tie bar system as described previously and below, in particular a tie bar system of a gas turbine as described above and below, which comprises the following steps:—preloading of the tie bar through actuation of the clamping device;—retensioning of the tie bar by tightening the clamping screws in the passages.

With regard to the method according to the invention, it should be noted that before the method is implemented, it is necessary for the clamping device to be screwed to the clamping nut in such a manner that a preloading and retensioning of the tie bar system can take place. In this case, for example, the clamping device can only be screwed onto the clamping nut when it has already been screwed to the tie bar itself. It is likewise conceivable for them both to be screwed to one another already at a point in time after which the clamping nut is then screwed onto the tie bar. Only after the clamping nut and the clamping device have been connected can preloading and retensioning according to the invention take place.

It is provided according to the invention that the annular clamping nut which exhibits a plurality of passages through each of which one of the plurality of clamping screws (i.e. multiple clamping screws) can extend moreover exhibits an external thread on the outer surface which runs substantially in the ring circumference direction of the outer surface. A course of the external thread in the ring circumference direction relates to a thread in this case which has a thread stroke in the longitudinal direction of the central recess of the clamping nut. This longitudinal direction corresponds to the longitudinal direction of a tie bar which may be received in the recess of the clamping nut.

Accordingly, the clamping nut can be tensioned in two ways by an application of force. On the one hand, the clamping nut may be tensioned as provided by the state of the art by tightening the plurality of clamping screws extending through the passages; likewise, however, the clamping nut may also be exposed to a tensioning force via the external thread. This tensioning force may be applied by the clamping device according to the invention, said clamping device exhibiting a suitable counter-thread to the external thread of the clamping nut and being at least partially screwed thereto. Through the screwing or through a further application of force by means of the clamping device, the clamping nut can be exposed to an additional tensioning force.

Through the tensioning of the clamping nut by means of the clamping device, the tension can be at least partially taken from the clamping screws, so that they are easier to screw in and unscrew. Particularly when loosening the clamping screws to relieve the load on the tie bar provided with annular clamping nuts, less effort is required to remove said clamping nuts from the passages. In other words, due to the at least partial load-relief, the probability of these clamping screws becoming stuck is lower.

In accordance with the method according to the invention, tensioning of the tie bar by means of the clamping nut can take place in two typically consecutive steps. A preloading of the tie bar may initially be undertaken by tensioning the clamping device, as a result of which the tie bar is exposed to a pre-loading force. This may amount to 90% of the total tensioning force, for example. The retensioning of the tie bar, in other words tensioning to the total clamping force, may take place by tensioning the clamping screws in the respective passages, for example. Once tensioning has taken place, the clamping device can then be released from the clamping nut, wherein the total tensioning force is now applied solely by the clamping screws in the passages of the clamping nut. During retensioning, however, the individual clamping screws are not exposed to the complete total tensioning force, which means that they can be screwed in with more control, comparatively speaking, and with less resistance.

Likewise, the tensioning of the tie bar system can furthermore be gradually released, in that the preloading, for example, is at least partially released to begin with by tensioning the tie bar by means of the clamping device, so that the tension on the individual clamping screws is thereby reduced. Following this load-removal process, the individual clamping screws can be loosened, wherein a smaller force is required to loosen said clamping screws. The risk of screws sticking is thereby also substantially reduced. It is thereby possible for the tie bar system to be dismantled more easily.

The annular clamping nut according to the invention and also the clamping device, the clamping nut system and the tie bar system consequently sometimes allow quicker and simpler dismantling of the tie bar system. Because the individual clamping screws only have to be loosened with a reduced clamping force, no regreasing of the clamping screws is necessary either, as only a smaller application of force is now needed in order to turn the clamping screws.

It should be pointed out here that clamping screws, unless otherwise indicated, should be taken to mean first clamping screws. This is to distinguish the clamping screws from other clamping screws which are introduced subsequently as second clamping screws. Therefore, unless it is otherwise indicated or it can be clearly inferred from the context, the term clamping screws relates to the first clamping screws in each case.

According to a first advantageous embodiment of the clamping nut according to the invention, it is provided that two adjacent passages in each case (with the same radial spacing) are spaced apart from one another uniformly in the circumferential direction. In this way, a largely uniformly distributed tensioning force can be exerted on the tie bar by the clamping screws via the clamping nut. The number of passages is arbitrary in this case, but is limited by the geometry and size of the annular clamping nut. The number of passages can be adjusted in each individual case.

According to the embodiment it is also possible for at least two rows of passages to be provided, each of which exhibits different radial spacings, wherein, however, the radial spacing within a row is constant. The radial spacings in this case are measured in respect of the center point of the central recess in the clamping nut. Individual adjacent passages in different rows may, in addition, be offset to one another in the ring circumference direction.

According to a further embodiment of the invention, it is provided that at least part of the wall of the central recess is configured as an internal thread which runs substantially in the ring circumference direction of the wall. Quite particularly, the entire wall is configured as an internal thread. Accordingly, the clamping nut can be exposed to a tensioning force directly via the central recess or via the wall thereof. Consequently, there is a comparatively large force-application surface available on the clamping nut, as a result of which the tie bar can be exposed to a comparatively large force.

According to a further embodiment of the invention, it is provided that the clamping nut is configured in such a manner that the passages exhibit a step-wise narrowing in the longitudinal direction. In particular, the step-wise narrowing of all passages at the same level of the clamping nuts in the longitudinal direction is provided. The step-wise narrowing allows the application of force on the clamping nut in the narrowing region via a suitably matching head of a clamping screw, so that an internal thread in the passages can also be dispensed with.

According to a further embodiment of the clamping nuts, it is provided that the external thread on the outer surface only takes up part of the outer surface of the clamping nut and, particularly in the longitudinal direction with the step-wise narrowing of the passages, is only provided at a level in the longitudinal direction at which there is a narrowed section of the passages. The application of force on the clamping nut can therefore take place on the external thread in a region where the clamping screws do not sometimes apply high material stresses to the clamping nut. Instead, a material region of the clamping nut that only exhibits smaller material tensions can be exposed to a tensioning force. In this way, the tensioning force can be distributed comparatively uniformly over the clamping nut and material fatigue over the volume of the clamping nut can be statistically reduced.

According to another embodiment of the clamping nut system according to the invention, it is provided that the clamping ring has a central recess which is oriented concentrically to the central recess of the clamping nut. The clamping ring may be suitably inserted to transmit the clamping force; however it may also be provided for a comparative support of the clamping screws against a suitable counter-surface.

According to a first particular embodiment of the tie bar system according to the invention, it is provided that the clamping device is configured as a hydraulic lifting device. Consequently, the clamping screw may be hydraulically exposed to a tensioning force, in that the hydraulic lifting device, once the connection has been made between the clamping screw and the tie bar system, exposes said clamping screw to a compressive force (or tensile force) and therefore tensions the clamping nut. As explained in detail above, the tensioning may take place within the meaning of a preloading, so that the entire tensioning force need not be applied to the clamping nut. According to the embodiment, however, the entire tensioning force can also be applied by means of the clamping device.

Alternatively or also in addition, the clamping device may be configured as a lifting device provided with second clamping screws. In this case, the second clamping screws are used to expose the clamping device to a lifting force which is transferred via the clamping device to the clamping nut in non-positive contact therewith. In other words, the clamping nut can be exposed to a tensioning force in two ways, via first clamping screws and second clamping screws. Since the second clamping screws apply part of the tensioning force, the first clamping screws are under comparatively less tensioning force and are thereby relieved of load.

Equally, the lifting means of the clamping device may be hydraulically configured or, however, configured as clamping screws which are themselves screwed by suitable thread turns of the clamping device.

So that the internal thread of the recess in the clamping nut can be screwed onto a matching external thread of a tie bar of a gas turbine, it is necessary for it to have at least one internal thread with a diameter of at least 100 mm. Likewise, the lifting means must be configured to be able to expose the clamping device to a suitable clamping force (lifting force).

According to another embodiment of the method according to the invention, it is provided that furthermore the following steps are included: relieving of tension on the clamping device and release of the clamping device from the clamping nut. It may be subsequently guaranteed that the total tensioning force is exclusively applied by the clamping screws in the clamping nut wherein, however, during tensioning the individual clamping screws are relieved of tension by means of the clamping device.

The invention is to be explained in greater detail below with the help of individual figures. In this case, it should be pointed out that components which are provided with the same reference numbers exhibit the same technical effects.

Likewise, it should be pointed out that the technical features described below are claimed in any combination with one another, insofar as the combination can solve the problems on which the invention is based.

Furthermore, it should be pointed out that the figures should only be understood schematically without allowing any limitation in respect of the practicability of the invention.

DETAILED DESCRIPTION OF INVENTION

Figure 1:
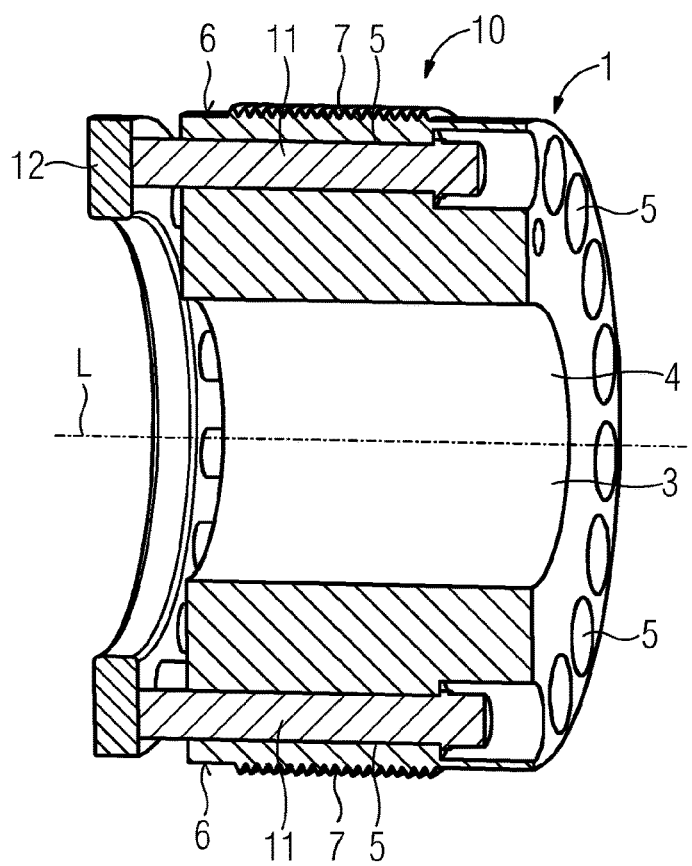
FIG. 1 shows a side sectional view through an embodiment of a clamping nut system according to the invention which comprises an embodiment of the clamping nut according to the invention.

FIG. 1 shows a side sectional view through a first embodiment of a clamping nut system 10 according to the invention which, in addition to an embodiment of a clamping nut 1 according to the invention, exhibits a number of clamping screws 11 (first clamping screws 11) and also a clamping ring 12. In addition to a central recess 3 for receiving a tie bar 2 (not shown in this case) the clamping nut 1 has a number of passages 5 parallel to the longitudinal direction L represented which are arranged in uniform radial spacings in the ring circumference direction. The passages exhibit a directional course which is substantially parallel to the longitudinal direction L. Clamping screws 11 are guided through each of the passages 5, which clamping screws are in contact with a clamping ring 12 at the ends in such a manner that said clamping ring supports the ends of the clamping screws 11. The clamping ring 12 has a central recess not further provided with a reference number which is arranged concentrically to the central recess 3 of the clamping nut 1. The clamping ring 12 itself is typically detached from the clamping nut and is separately mounted on the shaft or the tie bar (not shown in this case).

In order to tension the clamping nut system 10, the clamping screws 11 located in the individual passages 5 are suitably screwed in, so that with a corresponding fixing of the clamping screws 11 or the clamping nut 1, a clamping force is transferred to the tie bar 2 which is not further shown.

According to the embodiment, the tightening screws 11 have a screw head which, following the tensioning of the clamping nut 1, may lie on a material step in a respective passage 5 and result in an application of force to the clamping nut 1. The passages typically also have an internal thread into which the clamping screws can be screwed.

Figure 2:
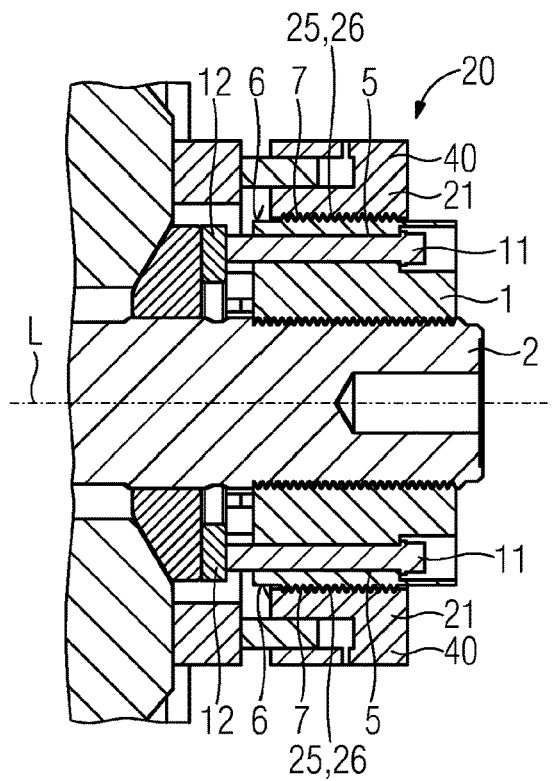
FIG. 2 shows a side sectional view through an embodiment of a tie bar system according to the invention which may comprise a rotary engine or a gas turbine and comprises an embodiment of the clamping nut according to the invention.

FIG. 2 shows an embodiment of the tie bar system 20 according to the invention which is depicted as a side sectional view. In addition to an embodiment of the clamping nut 1 according to the invention, the tie bar system 20 exhibits a tie bar 2 which is screwed via a suitable thread in the region of the wall 4 of the central recess 3 of the clamping nut 1 to the clamping nut 1. For the transmission of force during the tensioning of the clamping nut 1, clamping screws 11 are provided on the one hand which extend through the passages 5 in the clamping nut 1 and exhibit a clamping ring 12 at their end. The clamping ring 12 is used for support against components of the gas turbine (30).

In addition to the clamping screws 11 already known hitherto, the clamping nut 1 has a screw connection to a clamping device 21 which is connected to the clamping nut 1 in the region of the outer surface 6 via an external thread 7. The clamping device 21 in this case is configured as a hydraulic lifting device and likewise rests in turn against components of the bearing housing, so that following corresponding actuation of the hydraulic lifting device 21 transmitted via the threaded connection, the clamping nut 1 is exposed to a tensioning force. To be more precise, the clamping device 21 exhibits a recess 25 which has an internal thread 26 that can be screwed onto the matching external thread 7 of the clamping nut 2 and also at least one lifting means 40 which is configured, during correct actuation, to apply a tensioning force to the clamping device 21, wherein the at least one lifting means 40 in this case can rest against a component surface (component) of the gas turbine 30 comprising the tie bar 2.

During the tensioning of the tie bar 2, according to an embodiment of the method according to the invention, for example, the clamping device 21 can initially be actuated, as a result of which the clamping nut 1 is exposed to a preloading force. The clamping screws 11 are subsequently tightened and convey a further share of the total tensioning force. In turn, the clamping device 21 can then be removed from the clamping nut 1, in that it is relieved of load and unscrewed from the external thread 7.

Figure 3:
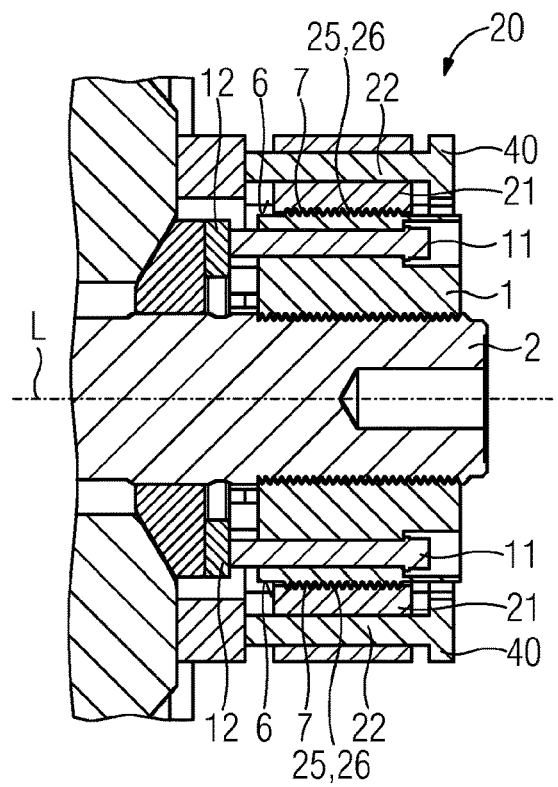
FIG. 3 shows a further embodiment of a tie bar system according to the invention as a side sectional view which may likewise comprise a rotary engine or else a gas turbine and comprises an embodiment of the clamping nut according to the invention.

FIG. 3 shows a further possible embodiment of the tie bar system 20 according to the invention which differs from the tie bar system 20 shown in FIG. 2 only in that the clamping device 21 is replaced by a screw lifting device. The screw lifting device is configured in such a manner that by means of second clamping screws 22, an application of force to the clamping nut 1 again transmitted via a threaded connection of the clamping device 21 and the screw nut 1 can take place. In order to tension the tie bar 2, a preloading force, for example, can thereby be created by tightening the second clamping screws 22, wherein the entire tensioning force is finally achieved in that the first clamping screws 11 also expose the clamping nut 1 to a clamping force accordingly.

Figure 4:
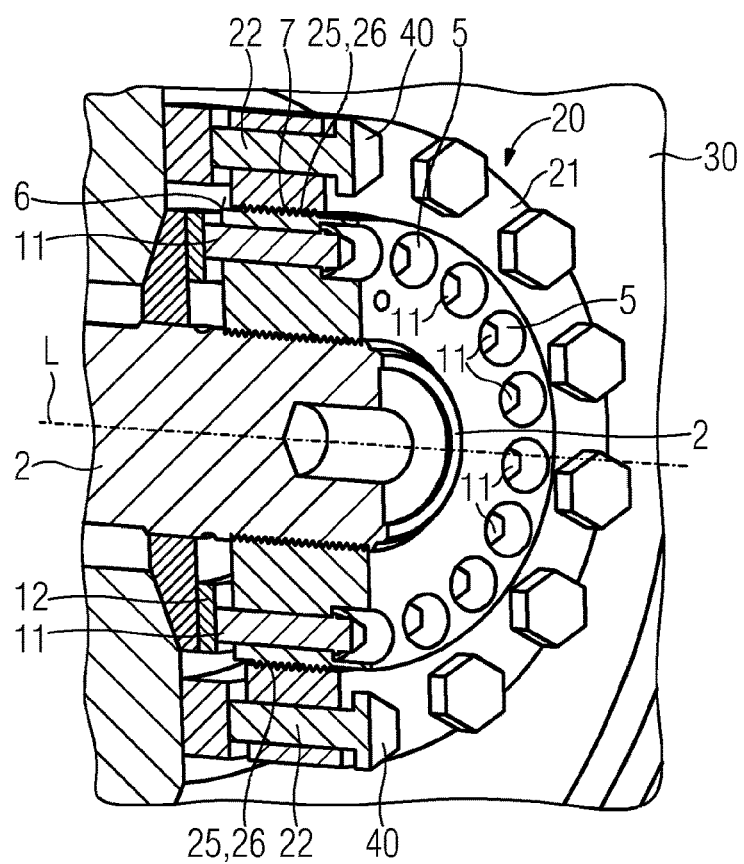
FIG. 4 shows a perspective partial sectional view through an embodiment of a gas turbine according to the invention which exhibits an embodiment of the tie bar system according to the invention.

FIG. 4 shows a further embodiment of the tie bar system 20 according to the invention which is included in a gas turbine 30. In this case, the embodiment of the tie bar system 20 is substantially identical to the embodiment in FIG. 3, wherein, however, the perspective representation shows individual components like the first clamping screws, for example, more clearly.

Figure 5:
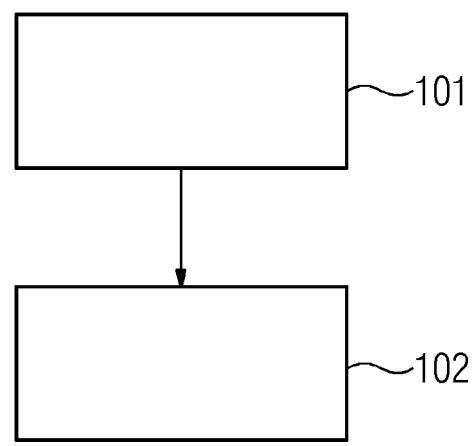
FIG. 5 shows an embodiment of the method according to the invention represented as a flow chart.

FIG. 5 shows as a flow-chart representation an embodiment of the method according to the invention for the tensioning of a tie bar system 20 (not shown in this case) or a tie bar system 20 not included in a gas turbine 30 (likewise not shown in this case), which comprises the following steps:—preloading of the tie bar 2 by actuating the clamping device 21 (first process step 101);—retensioning of the tie bar 2 by tightening the clamping screws 11 in the passages 5 (second process step 102).

In two subsequent optional process steps, it may be provided that the clamping device 21 is relieved of tension and the clamping device 21 is released from the clamping nut 1.

Further embodiments result from the dependent claims.

The invention claimed is:
1. A tie bar system comprising:
an annular clamping nut which is provided to be placed onto the end of a tie bar in order to tension said tie bar, comprising: a central recess for receiving the tie bar; passages with uniform radial spacings in a ring circumference direction which are parallel to a longitudinal direction, which passages are directed parallel to the longitudinal direction of the central recess; and on an outer surface of the clamping nut, an external thread which runs substantially in the ring circumference direction of the outer surface,
clamping screws which extend through the passages of the clamping nut, and
the tie bar, which is guided at the end through the central recess of the clamping nut, and
a clamping device arranged in a region of the outer surface of the clamping nut, which clamping device is screwed with the external thread of the clamping nut.

2. The tie bar system as claimed in claim 1,
wherein two adjacent passages of the passages in each case are spaced apart from one another uniformly in the ring circumference direction.

3. The tie bar system as claimed in claim 1,
wherein at least part of a wall of the central recess is configured as an internal thread which runs substantially in the ring circumference direction of the wall.

4. The tie bar system as claimed in claim 1,
wherein the passages exhibit a step-wise narrowing in the longitudinal direction.

5. The tie bar system as claimed in claim 1,
wherein the external thread on the outer surface only takes up part of the outer surface of the clamping nut, and is only provided at a level in the longitudinal direction at which there is a narrowed section of the passages.

6. The tie bar system as claimed in claim 1,
wherein the clamping screws each comprise an end, and wherein each end is in contact with a single clamping ring which is not included in the clamping nut.

7. The tie bar system as claimed in claim 1,
wherein the clamping device is configured as a hydraulic lifting device.

8. The tie bar system as claimed in claim 1,
wherein the clamping device is configured as a lifting device provided with second clamping screws.

9. The tie bar system as claimed in 1, wherein the clamping device comprises:
  a recess comprising an internal thread that is capable of being screwed onto the external thread of the clamping nut, and
  at least one lifting means which is configured, during correct operation, to apply a clamping force to the clamping device,
  wherein the at least one lifting means is adapted to rest against a component surface of a gas turbine including a tie bar during this operation.

10. A gas turbine comprising:
the tie bar system as claimed in claim 1.

11. A method of tensioning the tie bar system as claimed in claim 1, the method comprising:
preloading of the tie bar through actuation of the clamping device; and
retensioning of the tie bar by tightening the clamping screws in the passages.

12. The method as claimed in claim 11, further comprising:
relieving of tension on the clamping device, and
releasing of the clamping device from the clamping nut.

13. The tie bar system as claimed in claim 1,
wherein the external thread on the outer surface only takes up part of the outer surface of the clamping nut in the longitudinal direction with a step-wise narrowing of the passages.

14. The method as claimed in claim 11,
wherein the tie bar system is a tie bar system of a gas turbine.

* * * * *